(12) United States Patent
Kastner et al.

(10) Patent No.: US 8,720,499 B2
(45) Date of Patent: May 13, 2014

(54) AUTOMATED FUEL QUALITY DETECTION AND DISPENSER CONTROL SYSTEM AND METHOD, PARTICULARLY FOR AVIATION FUELING APPLICATIONS

(75) Inventors: Christopher K. Kastner, Upland, CA (US); Kevin G. Jensen, Lake Bluff, IL (US); Phillip A. Wetmore, The Woodlands, TX (US)

(73) Assignees: Fuel Guard Systems Corporation, Houma, LA (US); Chevron U.S.A. Inc., San Ramon, CA (US)

( * ) Notice: Subject to any disclaimer, the term of this patent is extended or adjusted under 35 U.S.C. 154(b) by 1113 days.

(21) Appl. No.: 12/015,111

(22) Filed: Jan. 16, 2008

(65) Prior Publication Data

US 2008/0230146 A1 Sep. 25, 2008

Related U.S. Application Data

(60) Provisional application No. 60/885,108, filed on Jan. 16, 2007.

(51) Int. Cl.
*B65B 1/04* (2006.01)

(52) U.S. Cl.
USPC ....... 141/94; 141/192; 222/189.06; 73/53.01; 73/61.43

(58) Field of Classification Search
USPC ............ 73/53.01, 61.43; 141/59, 94, 96, 192, 141/302, 231, 206; 222/189.06
See application file for complete search history.

(56) References Cited

U.S. PATENT DOCUMENTS

| | | | |
|---|---|---|---|
| 3,221,248 A | | 11/1965 | Batteau et al. |
| 3,748,576 A | | 7/1973 | Sigournay |
| 3,771,624 A | * | 11/1973 | Forgeron ...................... 184/6.24 |
| 3,824,823 A | * | 7/1974 | Pontello ....................... 73/865.9 |
| 3,876,307 A | | 4/1975 | Skala |
| 4,721,563 A | * | 1/1988 | Rosaen .......................... 210/85 |
| 4,723,049 A | | 2/1988 | Menard et al. |
| 4,814,087 A | | 3/1989 | Taylor |

(Continued)

FOREIGN PATENT DOCUMENTS

EP 0440299 A1 8/1991

OTHER PUBLICATIONS

"D-2 Incorporated Announces the Introduction of the Monitor/Filter Condition Sensor, JF-M3," Jan. 23, 2007.
"AFGUARD—Prototype Quality Guarantees Safety," Jul. 9, 2006.

(Continued)

*Primary Examiner* — Jason K Niesz
(74) *Attorney, Agent, or Firm* — Withrow & Terranova, PLLC

(57) ABSTRACT

A fuel quality monitoring system and method to automatically and/or continuously monitor quality of fuel dispensed and control the operation of the fuel dispenser. The control system monitors fuel quality to prevent unsafe refuelings when the fuel quality is unacceptable. In one embodiment, a combination of a differential pressure sensor, a water detector, and/or a particle monitor is employed inline the fuel flow path of a fuel dispenser, and in particular an aviation refueling truck, to monitor the quality of the fuel. If fuel quality is at an acceptable level although not ideal, the control system can allow fueling with the generation of reports and alarms. If the fuel quality is unacceptable, fuel flow can be stopped. If the differential pressure across the filter indicates a high degree of debris and/or water retention, the control system can automatically lower the flow rate to reduce the risk of filter breakdown without completely preventing fueling until the filter can be replaced.

50 Claims, 8 Drawing Sheets

(56) References Cited

U.S. PATENT DOCUMENTS

| | | | |
|---|---|---|---|
| 4,934,565 A * | 6/1990 | Heisey et al. | 222/22 |
| 4,981,272 A | 1/1991 | Cutore | |
| 5,200,064 A * | 4/1993 | Russ et al. | 210/94 |
| 5,268,095 A | 12/1993 | Barzuza | |
| 5,437,256 A | 8/1995 | Woletz et al. | |
| 5,455,513 A | 10/1995 | Brown et al. | |
| 5,534,708 A | 7/1996 | Ellinger et al. | |
| 5,711,456 A | 1/1998 | Bryant | |
| 5,719,781 A | 2/1998 | Leatherman et al. | |
| 5,720,176 A | 2/1998 | Manson et al. | |
| 5,722,469 A | 3/1998 | Tuminaro | |
| 5,754,055 A | 5/1998 | McAdoo et al. | |
| 5,784,742 A | 7/1998 | Giuliani et al. | |
| 5,794,667 A * | 8/1998 | Payne et al. | 141/128 |
| 5,880,480 A | 3/1999 | Ellinger et al. | |
| 5,971,042 A | 10/1999 | Hartsell, Jr. | |
| 6,121,628 A | 9/2000 | Rising | |
| 6,126,818 A | 10/2000 | Duerrstein et al. | |
| 6,163,738 A | 12/2000 | Miller | |
| 6,182,710 B1 | 2/2001 | Webb | |
| 6,223,765 B1 | 5/2001 | Small et al. | |
| 6,361,684 B1 | 3/2002 | Hawkins et al. | |
| 6,470,233 B1 | 10/2002 | Johnson, Jr. | |
| 6,803,775 B2 | 10/2004 | Sanchez et al. | |
| 6,926,827 B2 | 8/2005 | Gruca et al. | |
| 6,935,191 B2 * | 8/2005 | Olivier et al. | 73/861.79 |
| 6,992,569 B2 | 1/2006 | Nimberger et al. | |
| 6,996,970 B2 | 2/2006 | Lorenz | |
| 7,174,273 B2 | 2/2007 | Goldberg | |
| 7,412,896 B2 * | 8/2008 | Janik et al. | 73/753 |
| 7,518,719 B2 * | 4/2009 | Sprenger et al. | 356/243.2 |
| 7,540,141 B2 * | 6/2009 | Goldberg et al. | 60/39.281 |
| 8,149,401 B2 | 4/2012 | Stevens et al. | |
| 2004/0232075 A1 | 11/2004 | Wells | |
| 2005/0040834 A1 | 2/2005 | Sanchez et al. | |
| 2005/0092074 A1 * | 5/2005 | Beaucaire et al. | 73/117.2 |
| 2005/0150304 A1 * | 7/2005 | Gustafson et al. | 73/754 |
| 2005/0242110 A1 | 11/2005 | Waugh et al. | |
| 2007/0044865 A1 * | 3/2007 | Ruesch et al. | 141/301 |
| 2007/0119859 A1 | 5/2007 | Harrell | |

OTHER PUBLICATIONS

PCT International Search Report and Written Opinion of the International Searching Authority dated Jul. 8, 2008, corresponding PCT application serial No. PCT/US2008/051197 filed Jan. 16, 2008.

Supplementary European Search Report for European Patent Application No. 08727755.4 issued Jan. 4, 2012, 2 pages.

Unknown, "Aviation," Facet, a Clarcor company, Dec. 13, 2006, accessed Apr. 19, 2012, 2 pages, http://www.facetusa.com/f_aviation_index.htm.

Unknown, "Gammon Gauge", Bulletin 25, Gammon Technical Products, Inc., updated Jul. 2005, 4 pages, http://www.gammontech.com/mainframe/pdf/b025.pdf.

Unknown, "Quantum 4 Submersible Pumps: Installation, Operation, Service & Repair Parts," 042-129-1, Rev. E, Veeder Root, Jun. 2001, 33 pages, http://www.veeder.com/object/042-129-1.html.

Examiner's First Report for Australian patent application 2008206281 mailed May 31, 2012, 4 pages.

* cited by examiner

FUEL QUALITY LOGIC

| STEPS | CONTROLLED FLOW RATE | SIGNAL | PARTICLE COUNT LOW/HIGH (PM 44) | | % WATER CONTENT (42) | | DELTA P LOW/HIGH (DPS 36) |
|---|---|---|---|---|---|---|---|
| 1 | STOP FLOW | ALARM | HIGH | OR | HIGH | OR | HIGH THEN LOW |
| 2 | LOW FLOW | LOW FLOW AND CHECK FILTER | <= MEDIUM | AND | <= MEDIUM | AND | HIGH |
| 3 | HIGH FLOW | CHECK FILTER | MEDIUM | OR | MEDIUM | OR | MEDIUM |
| 4 | HIGH FLOW | OK | LOW | AND | LOW | AND | LOW |

LEGEND

PARTICLE COUNTER   HIGH:    > ~15 PPM
                   MEDIUM:  ~15 PPM <= ~5 PPM
                   LOW:     < ~5 PPM

% WATER CONTENT    HIGH:    > ~15 PPM
                   MEDIUM:  ~15 PPM <= ~5 PPM
                   LOW:     < ~5 PPM

DIFFERENTIAL       HIGH:    > ~14.5 PSI
PRESSURE           MEDIUM:  ~14.5 PSI <= ~7 PSI
                   LOW:     < ~7 PSI

HIGH FLOW:  > ~200 GPM
LOW FLOW:   ~80 GPM
STOP FLOW:  0 GPM

*FIG. 3*

AUTOMATED FUEL QUALITY DETECTION AND DISPENSER CONTROL SYSTEM AND METHOD, PARTICULARLY FOR AVIATION FUELING APPLICATIONS

PRIORITY CLAIM

This application claims the benefit of provisional application Ser. No. 60/885,108, filed Jan. 16, 2007, which is relied upon and incorporated herein by reference in its entirety.

FIELD OF THE INVENTION

The present invention relates to a fuel quality detection and dispenser/refueler control system and method wherein the quality of fuel or supporting fueling components are monitored using sensing devices, either individually or in combination, to ensure that the fuel quality is acceptable to be dispensed for use. Stoppage or reduction of fuel flow may be imposed in response to detection of a lessened quality condition or filter break down risk. The present invention is not limited to, but is particularly suited for aviation fueling applications.

BACKGROUND OF THE INVENTION

Fuel dispensers are used to dispense fuel to vehicles and other equipment requiring fuel for operation. The basic components of a fuel dispenser are as follows. The fuel dispenser includes a fuel conduit that receives fuel from a fuel source and directs the received fuel to an outlet to be dispensed into desired equipment when the fuel dispenser is activated. A pump, either self-contained within the fuel dispenser or located outside the fuel dispenser but coupled to the fuel conduit, provides the pumping force to direct the fuel through the fuel dispenser when activated. Once the fuel is pumped into the fuel conduit inside the fuel dispenser, it encounters a number of fuel-handling components located inline the fuel conduit before eventually being delivered. For example, the fuel encounters a meter to measure the amount of fuel being dispensed. A fuel flow control valve is located inline the fuel conduit either on the inlet or outlet side of the meter to control whether the fuel is allowed to pass through the fuel conduit to the outlet of the fuel dispenser. The outlet of the fuel dispenser is typically comprised of a flexible hose that is coupled to the fuel conduit on one end and to a nozzle on the other. A user engages the nozzle handle trigger to allow fuel flow. The nozzle also contains its own fuel flow control valve that is trigger-activated by the user.

An example of a fuel dispenser that is employed in the aviation industry, in particular to fuel aircraft, is illustrated in FIGS. 1A and 1B. As shown, a refueling truck 10 is provided that contains an onboard fuel tank 12 and an onboard fuel dispenser 14. The refueling truck 10 is mobile so that the onboard fuel dispenser 14 can be conveniently located proximate the desired aircraft for refueling the aircraft. Thus, the fuel tank 12 is located onboard. This is different from typical automobile fuel dispensers that are static and are not transported on trucks or other vehicles. As a result, fuel tanks 12 used to provide fuel to automobile fuel dispensers are located separate from the fuel dispenser, typically beneath the ground. Examples of typical automobile fuel dispensers are described in U.S. Pat. Nos. 5,719,781 and 6,470,233, each of which is incorporated by reference herein in its entirety. However, a typical automobile fuel dispenser contains similar components and performs similar functionalities to an aircraft refueling truck 10 with an onboard fuel dispenser 14.

As shown in the close-up illustration of the fuel dispenser 14 in FIG. 1B, a meter 16 is coupled inline the fuel conduit 18 to measure the fuel as it is delivered. A registration device or computer 20 is coupled to the meter 16 that converts the amount of fuel delivered through the meter 16 into a volumetric measurement, typically in the form of gallons. The computer 20 may also further convert the volumetric measurement into a price charged to the user for the fuel. The computer 20 typically contains a display that displays the volume of fuel dispensed, and price if applicable. After the fuel exits the meter 16 through the fuel conduit 18, the fuel is delivered to a hose 22 coupled to fuel conduit 18. The user unwinds the hose 22, which is coiled in the example of the refueling truck 10 illustrated, and places the nozzle (not shown) coupled to the end of the hose 22 to the aircraft (not shown) desired to be refueled.

Debris/particulates and undissolved water can collect inside the fuel tank 12. Debris may be present due to debris being passed into the fuel tank 12 when fuel tank 12 is filled itself. Debris may also be present by rust or other failures of the material used to construct the inside of the fuel tank 12. Water may also collect inside the fuel tank 12 as a result of condensation. Both debris and water in fuel can be hazardous to a vehicle and especially aircraft, because it may cause the engine to be disrupted and/or not perform in a safe manner. For this reason, it is important to prevent debris and water from being dispensed into a vehicle or aircraft fuel tank that will reach its engine. Manual inspection tests, water tests, and particle contaminant tests are employed to inspect fuel quality periodically by refueling personnel. For example, some fuel is dispensed into a jar or clear container called a "sight jar" that is typically mounted on the refueling truck 10 to visually inspect the fuel for impurities. Manual water tests are employed to detect the presence of water. A manual particle test may ups taps in the fuel streams and strip color to visually determine particle levels. These tests are subjective and subject to human error. Further, the test results are typically logged in a log book, thereby increasing the possibility for error due to the human factor. Log books can also be disputed. Further, these tests may only be performed after bad or unacceptable fuelings have taken place.

As a result, filters are employed as an automatic method to prevent debris and water from passing through to the aircraft. An example of a fueling filter is the Filter water separator/filter monitor filter manufactured by Facet, Velcon, or Faudias described at http://www.facetusa.com/f_aviation_index.htm, which is incorporated herein by reference in its entirety. The filter is coupled inline the fuel conduit 18. The 1583 monitor filter not only collects debris, but also contains an absorbent material that collects water present in the fuel. However, filters can clog. Filters can clog by collecting and blocking debris or water, which closes off the size of the fuel flow path internal to the filter. As a result, the pressure differential across the filter increases. If the pressure goes too high, say 15 psi for example, the filter itself may break down causing debris to be passed on in the fuel to the vehicle or aircraft. Thus, a differential pressure sensor is often further employed to measure the pressure increase across the filter to indicate that the filter is clogged or may not be working properly. An increase in pressure beyond a certain threshold is indicative of a blockage. The filter can then be manually changed with a new, unclogged filter as a result.

One example of such a filter that employs a differential pressure monitor is the differential pressure filter gauge manufactured by Gammon, described at http://www.gammontech.com/mainframe/pdf/b025.pdf, which is incorporated herein by reference in its entirety. The filter apparatus contains a steel ball that is visible to refueling personnel and which floats higher in proportion to higher pressure across the filter. If the float reaches a level that indicates too high of a differential pressure across the filter, say 14 psi for example, the refueling personnel interlocks the fuel conduit 18 and replaces the filter. Refueling personnel often attempt to continue refueling without replacing the filter, say for example when the differential pressure reads 12 psi, as a result of the refueling personnel slowing the flow rate. This decreases the pressure across the filter, thus making it less likely the filter will break down. Or, refueling personnel will prematurely replace the filter when the differential pressure is not high enough to warrant such action, thereby increasing downtime and operation costs. These filters suffer from manual inspection as well as the subjective decision making of the refueling personnel.

As a result of this manual inspection by refueling personnel, some filters further include a proximity sensor that automatically detects when the steel ball reaches the unsafe pressure level and before the filter breaks down. The proximity sensor causes the fuel dispenser 14 to shut down to disallow fueling until refueling personnel replace the filter.

While these present methods of ensuring fuel quality are acceptable for fuel to be dispensed, manual tests are required that are subject to human error, subjective decision making, non-guaranteed execution, and further may only be performed after bad refuelings have taken place. In addition, the methods either rely on refueling personnel to replace filters at the correct time, or if a system is employed to shut down the truck when the differential pressure across the filter exceeds the safe level automatically, fuel flow is ceased abruptly and without warning, thus additionally inconveniencing the refueling personnel and the aircraft expecting to be refueled. Also, refueling personnel make subjective decisions to slow flow rate based on a visual inspection of the differential pressure across the filter to lessen the likelihood of a filter break down. As a result, the fuel quality of fuel delivered may be inconsistent and throughput efficiency may be reduced by not replacing the filter in a timely and predicted manner.

It is a desire and goal of the present invention to monitor and determine fuel quality continuously, before a bad or unacceptable refueling takes place, and to not rely on the subjective decision making of refueling personnel to take corrective measures, such as when to replace a filter that collects debris and water.

SUMMARY OF THE INVENTION

The present invention provides a fuel quality monitoring system and method using one or more sensing devices to automatically and continuously monitor the quality of fuel dispensed and control the operation of the fuel dispenser. This is opposed to relying on refueling personnel to conduct manual tests, make subjective decisions subject to human error, and only apply logic based on single measurement activities relating to fuel quality. The control system monitors fuel quality to prevent unsafe or "bad" refuelings when the fuel quality is unacceptable or not within prescribed limits. If the fuel quality is at an acceptable limit and the fuel filter is operating sufficiently, high flow rate and dispensing is allowed. If fuel quality is at an acceptable level to allow dispensing, but the filter has the potential to break down due to an increased differential pressure due to filtered debris and/or absorbed water within the filter, the control system can automatically lower the flow rate to alleviate the risk of filter break down without completely preventing fueling. This lower flow rate condition will continue until corrective measures are taken to the filter, such as replacement.

In one embodiment, a combination of a differential pressure sensor, a water detector, and/or a particle monitor are employed inline the fuel flow path of a fuel dispenser, and in particular an aviation refueling truck containing its own fuel tank supply, to monitor the quality of the fuel. Each of these devices individually indicate some measure of fuel quality, but their analysis in combination can yield a more complex and more accurate overall picture of fuel quality. The sensing devices are coupled to a control system. The control system monitors the status and data from the sensing devices and makes decisions about control of fuel delivery in an automated fashion rather than refueling personnel relying on manual tests, visual inspections, and subjective and possibly incorrect or inefficient decisions regarding filter changes.

By providing an automatic and controlled logic, the quality of fuel can be ensured and can be consistent. Further, because the control system can monitor a combination of sensing devices and make more complex decisions about the severity or acceptability of the fuel quality, controlled actions rather than full, high flow rate or shut down can be employed. Some conditions may still allow for low flow in a safe condition. Other conditions may still continue to allow high flow, but under an alarm or reported condition so that the filter can be changed ahead of time before a low flow condition is enforced.

The control system can generate automatic alarms and/or notifications to indicate and log fuel quality and/or filter status as well as the status of the sensing devices individually rather than relying on service personnel to manually report or log fuel quality. The notifications, reports and/or alarms can be reported on-site on the refueling truck or off-site via remote communications to a remote system. The remote system monitors the situation and maintains records for safety, to protect against liability disputes, and for any disputes, including billing, that may arise.

The present invention also allows for refueling personnel to program in acceptable limits for sensing devices for the control system to use to control dispensing and/or reports and notifications when performing the fuel quality logic. The limits may be programmed as hard limits that do not change, or may be programmed to be initial limits that are then adjusted automatically by the control system based on feedback from actual operations. A "learned" limit for differential pressure for example, may be beneficial because variations in fuel conduits and filter brands can vary in nominal differential pressure. This reduces false alarms. Further, filtering on data, including eliminating outlier or extreme data measurements can be performed to reduce false alarms. Also, monitoring of differential pressure across the fuel filter and control of fueling in response thereto may be more accurately performed by determining differences from normal operating pressure learned over time when the filter is in a known, good condition, rather than initial limits.

The present invention may also be employed on a hydrant cart refueling truck that obtains its fuel to delivery from a separate storage tank. The present invention, and particularly the control system and the components necessary to determine the fuel quality and related statuses described above, may also be provided on a new refueling truck during manufacture or may be retrofitted to existing refueling trucks. Further, the control system and/or monitoring devices of the present invention may be powered by a power system on the refueling truck, an external source, or by battery power as examples.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 3 is a fuel quality logic state machine employed by the monitoring and control system in accordance with one embodiment of the present invention to control the fuel flow dispensed based on the monitored quality of fuel or supporting fueling components in the fuel delivery flow path;

DETAILED DESCRIPTION OF THE PREFERRED EMBODIMENTS

Figure 1A:
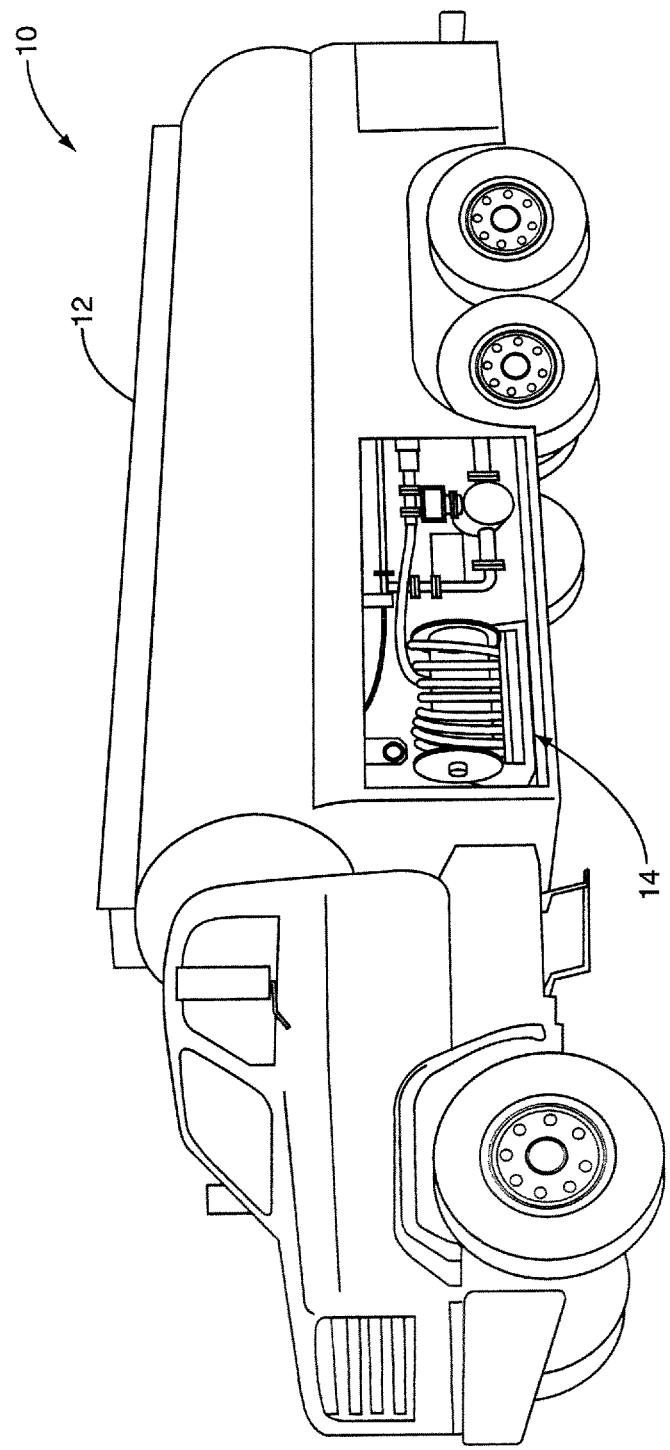
FIGS. 1A and 1B are schematic diagrams of a fueling truck and a fuel dispenser onboard the fueling truck in the prior art used to dispense fuel into aircraft. The present invention may be incorporated into the fueling truck.
Figure 1B:
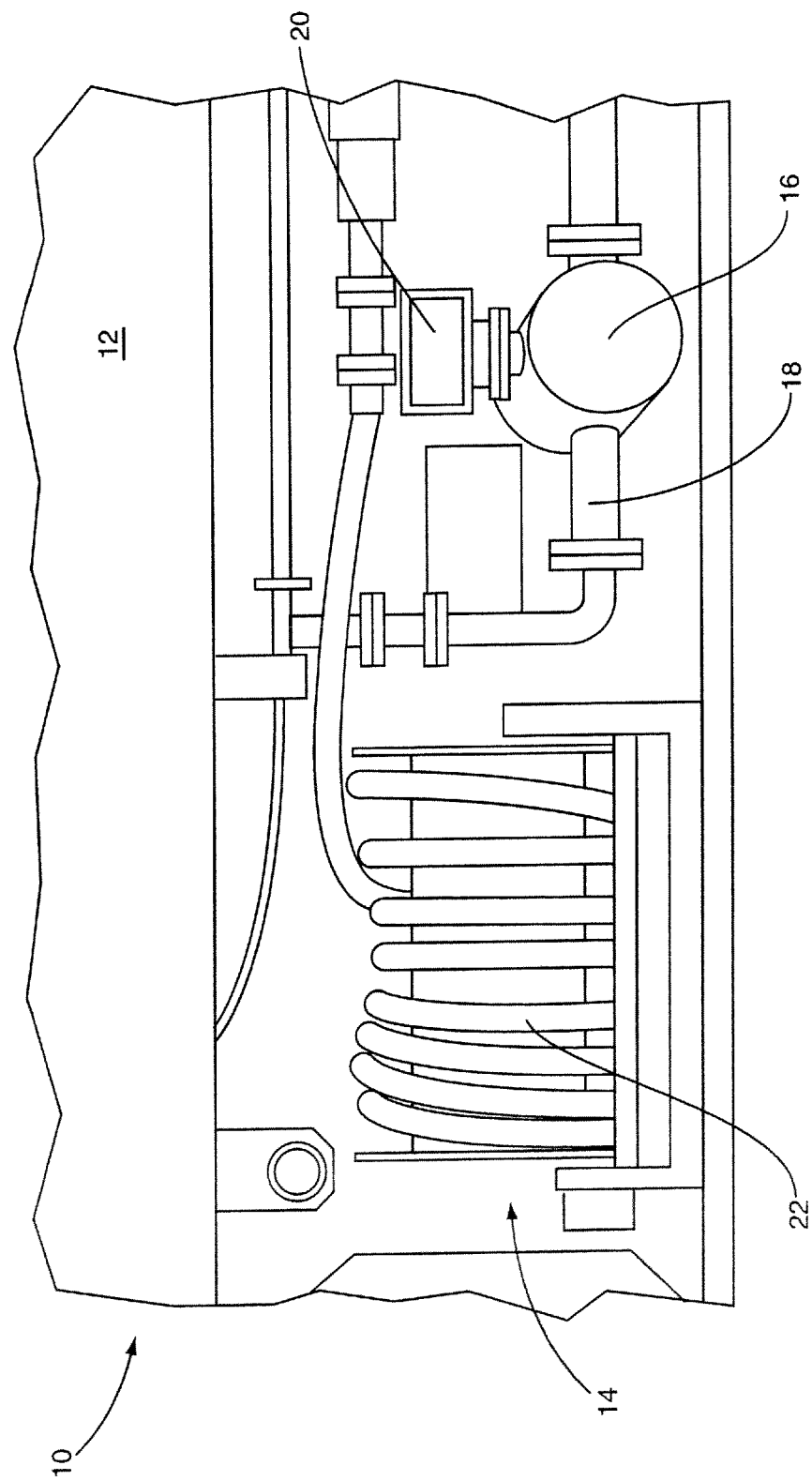

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention employs a fuel quality monitoring system and method using one or more sensing devices to automatically and continuously monitor the quality of fuel dispensed and control the operation of the fuel dispenser. This is opposed to relying on refueling personnel to conduct manual tests, make subjective decisions subject to human error, and only apply logic based on single measurement activities relating to fuel quality. The control system monitors fuel quality to prevent unsafe or "bad" refuelings when the fuel quality is unacceptable or not within prescribed limits. If the fuel quality is at an acceptable limit and the fuel filter is operating sufficiently, high flow rate and dispensing is allowed. If fuel quality is at an acceptable level to allow dispensing, but the filter has the potential to break down due to an increased differential pressure due to filtered debris and/or absorbed water within the filter, the control system can automatically lower the flow rate to alleviate the risk of filter break down without completely preventing fueling. This lower flow rate condition will continue until corrective measures are taken to the filter, such as replacement.

In one embodiment, a combination of a differential pressure sensor, a water detector, and/or a particle monitor are employed inline the fuel flow path of a fuel dispenser, and in particular an aviation refueling truck, to monitor the quality of the fuel. Each of these devices individually indicate some measure of fuel quality, but their analysis in combination can yield a more complex and more accurate overall picture of fuel quality. The sensing devices are coupled to a control system. The control system monitors the status and data from the sensing devices and makes decisions about control of fuel delivery in an automated fashion rather than refueling personnel relying on manual tests, visual inspections, and subjective and possibly incorrect or inefficient decisions regarding filter changes.

By providing an automatic and controlled logic, the quality of fuel can be ensured and can be consistent. Further, because the control system can monitor a combination of sensing devices and make more complex decisions about the severity or acceptability of the fuel quality, controlled actions rather than full, high flow rate or shut down can be employed. Some conditions may still allow for low flow in a safe condition. Other conditions may still continue to allow high flow, but under an alarm or reported condition so that the filter can be changed ahead of time before a low flow condition is enforced.

The control system can generate automatic alarms and/or notifications to indicate and log fuel quality and/or filter status as well as the status of the sensing devices individually rather than relying on service personnel to manually report or log fuel quality. The notifications, reports and/or alarms can be reported on-site on the refueling truck or off-site via remote communications to a remote system. The remote system monitors the situation and maintains records for safety, to protect against liability disputes, and for any disputes, including billing, that may arise.

Figure 2:
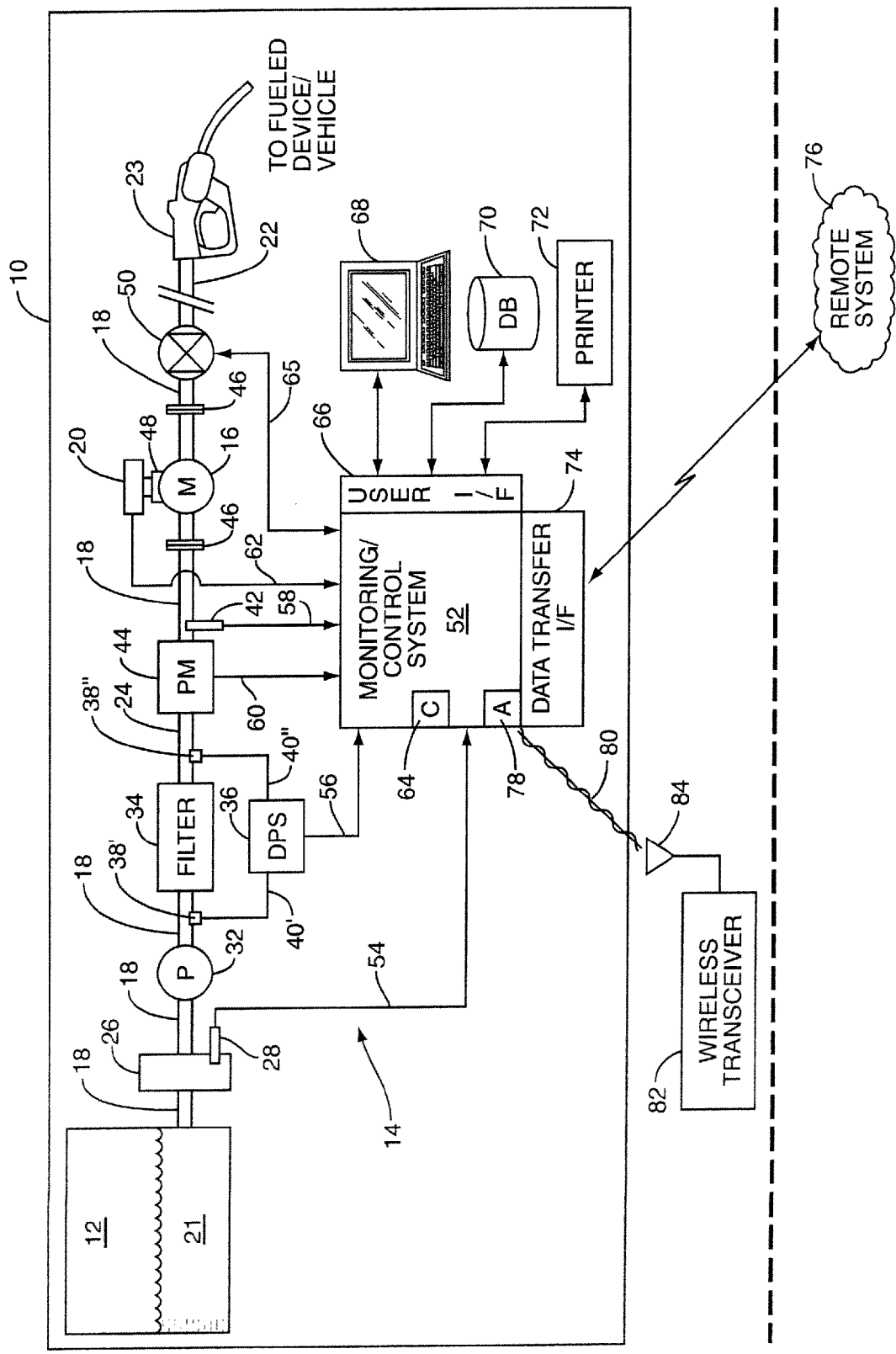
FIG. 2 is a schematic diagram of a quality detection and prevention monitoring and control system according to one embodiment of the present invention that may be employed on the fueling truck illustrated in FIGS. 1A and 1B to monitor the quality of fuel or supporting fueling components in the fuel delivery flow path.

The present invention also allows for refueling personnel to program in acceptable limits for sensing devices for the control system to use to control dispensing and/or reports and notifications when performing the fuel quality logic. The limits may be programmed as hard limits that do not change, or may be programmed to be initial limits that are then adjusted automatically by the control system based on feedback from actual operations. A "learned" limit for differential pressure for example, may be beneficial because variations in fuel conduits and filter brands can vary in nominal differential pressure. This reduces false alarms. Further, filtering on data, including eliminating outlier or extreme data measurements can be performed to reduce false alarms. Also, monitoring of differential pressure across the fuel filter and control of fueling in response thereto may be more accurately performed by determining differences from normal operating pressure learned over time when the filter is in a known, good condition, rather than initial limits. Before discussing the particular aspects of the fuel quality logic used to control the fuel dispensing, a basic architecture of the fuel dispenser 14 in accordance with one embodiment of the present invention is illustrated in FIG. 2 and described below. Turning to FIG. 2, element 10 is intended to represent the refueling truck 10 because the disclosed embodiment is a fuel dispenser for aviation applications. However, the present invention may be employed in any type of fuel dispenser for any application desired. The refueling truck 10 contains its own fuel tank 12 that contains fuel 21 to be dispensed. The fuel conduit 18 is coupled to the fuel tank 12 to receive fuel 21 when dispensing is desired.

A sump 26 may be provided to allow for an optional moisture or water sensor 28 to detect the presence of water in the fuel 21 at the initial point of delivery. Moisture or water in the fuel 21 is typically detected by percentage via the parts per million (PPM) present. Once the moisture or water level reaches a certain water PPM threshold, say 30 PPM in the aviation industry for example, the fuel 21 is deemed to contain too much water to be safe for use. However, the moisture or water sensor 28 takes no corrective action to remove the water or moisture from the fuel 21. That will be the job of the fuel filter 34, discussed below. The fuel 21 is allowed to continue in the fuel conduit 18. However, the moisture or water sensor 28 is coupled to the control system 52. The moisture or water sensor 28 allows the control system 52 to determine if the fuel filter 34 is properly removing or absorbing water, as will be described later below. The moisture or water sensor 28 may for example be the moisture sensor manufactured by Parker, and disclosed at http://www.parker.com/euro_filtration/netwweb/uccweb/pdf/FDCB125GB2MS100.pdf, incorporated herein by reference in its entirety.

A pump 32 is provided on the outlet side of the sump 26 that pumps the fuel 21 from the fuel tank 12 into the fuel conduit 18 and towards the nozzle 23 for dispensing. The pump 32 can be any type of pump, including a vacuum or pressure based pump, and/or a mechanical or electro-mechanical pump, including a turbine pump and/or venturi based pump. For aviation fueling applications, the pump 32 is onboard the refueling truck 10. For vehicle fueling applications, the pump 32 may be inside the fuel dispenser or may be located proximate the fuel storage tank underneath the ground in the form of a submersible turbine pump. An example of a submersible turbine pump manufactured by Veeder-Root Company is the Quantum submersible turbine pump disclosed at http://www.veeder.com/page/PumpManuals, Quantum 4" Submersible Pumps Installation, Operation, Service & Repair Parts (042-129-1 Rev E) (PDF), and the pump described in U.S. Pat. No. 6,223,765, both of which are incorporated herein by reference in their entireties.

After the fuel 21 leaves the pump 32, the fuel 21 will enter the fuel filter 34, which filters debris and/or water. The filter 34 may be may be the Facet FWS or Filter Monitor filter, disclosed at http://www.facetusa.com/f_aviation_index.htm, incorporated herein by reference in its entirety. The filter 34 collects any debris or water that is present in the fuel 21. The filter 34 contains a water absorbent material that decreases the internal fuel flow path (not shown) in the filter 34, thereby causing an increased pressure drop across the filter 34. Debris collected by the filter 34 also causes the pressure drop across the filter 34 to increase. Fuel 21 passes through the filter 34 without obstruction unless debris or water has been collected and is being retained in the filter 34. The filter 34 is a replaceable device that is exchanged for a clean, unclogged filter periodically so that the filter 34 will continue to operate to separate and prevent debris and water from reaching the nozzle 23 and being dispensed with the fuel 21 as intended.

The filter 34 is also typically designed to handle up to 15 psi in the internal fuel flow path (not shown) before the elements of the filter 34 start to break down and block or clog the filter 34. The filter 34 is designed for a breakdown pressure point in order to cause its differential pressure to increase when the filter 34 has failed. In order to detect the differential pressure across the filter 34, a differential pressure sensor 36 may be employed as illustrated in FIG. 2. As previously discussed, the differential pressure sensor 36 senses the pressure drop across the inlet 38' and outlet 38" sides of the filter 34. The differential pressure sensor 36 records the pressure differential between the inlet 38' and outlet 38" via signals provided on lines 40' and 40" and creates a signal on a differential pressure signal line 56 to communicate the differential pressure to the control system 52 for use in the fuel quality logic.

After the fuel 21 leaves the outlet 38" of the filter 34, the fuel 21 enters a particle monitor 44. The particle monitor 44 detects particle contaminants in the fuel 21 by determining the particle count in units of parts per million (PPM). The higher the particle count, the lower the fuel 21 quality. If the particle count in the fuel 21 reaches a certain threshold, say 15 PPM or equivalent particle counts PPM in the aviation industry for example, the fuel 21 is deemed to contain too many particles to be safe for use. One example of a particle monitor 44 that may be employed in the present invention is the Hach Ultra Analytics PM4000 particle monitor described at www.hachultra.com, incorporated herein by reference in its entirety. The particle monitor 44 is electrically coupled to the control system 52 via particle monitor line 60 so that the control system 52 receives the particle count in the fuel 21 as fuel dispensing is performed. The control system 52 also uses the particle count in its fuel quality logic.

After the fuel 21 leaves the particle monitor 44, the fuel 21 passes through another water sensor 42. This water sensor 42 is placed inline to the fuel conduit 18 as opposed to the moisture or water sensor 28 in the sump 26. The water sensor 42 is coupled to the control system 52 via water sensor line 58. The water sensor 42 again determines the water content in the fuel 21 as a function of percentage parts (PPM). However, by placement of this water sensor 42 on the outlet side of the particle monitor 44, the control system 52 can determine if any moisture or water that was detected in the sump 26 via the moisture or water sensor 28, was properly absorbed by the filter 34. Thus, the control system 52 can in effect determine the water absorption performance of the filter 34 and generate an alarm or check filter status if the filter 34 is not properly absorbing water. If water was present at the moisture or water sensor 28, but none is detected at the water sensor 42, the filter 34 absorbed the water present in the fuel 21. If less than all the detected water at the moisture sensor 28 was absorbed, via the water sensor 42 detecting some but not the same amount of water at moisture sensor 26, the filter's 34 performance in this regard can be measured by the control system 52 to take any corrective and/or control actions necessary and programmed.

The fuel 21 then continues in the fuel conduit 18 through a manifold 46 that allows the meter 16 to be coupled inline to the fuel conduit 18 on its inlet side. The meter 16 is also coupled to the fuel conduit 18 using another manifold in its outlet side. As the fuel 21 passes through the meter 16, the meter 16 converts the flow of fuel 21 into either an electrical or mechanical signal 48 representing the volume of fuel 21 passing through the meter 16 and communicates this signal to the computer 20 to display the volume of fuel 21 dispensed. The computer 20 may also display the price of the fuel 21 dispensed based on the volume and a set price per volume to be charged to the customer.

Note that the filter 34 and particle monitor 44 are placed on the inlet side of the meter 16. This is so that any water or debris that the filter 34 can remove from the fuel 21 is performed before the fuel 21 reaches the meter 16 to be metered. Metering of contaminated fuel may be in violation of agreements with customers to be charged for a certain quality of fuel, or at a minimum is a good business practice to avoid, which the present invention provides. Further, contaminants passed through the meter 16 will cause meter wear, thereby making the meter inaccurate over time. This is because the meter 16 is typically a positive displacement meter where a known volume is displaced. Contaminants cause the internal volume to increase, thereby dispensing more fuel than charged when this occurs. As a result, calibration would also be required more often if the filter 34 is not placed on the inlet side of the meter 16.

The fuel 21 next encounters a fuel flow control valve 50. The fuel flow control valve 50 is typically a solenoid controlled proportional valve that is controlled by the control system 52 to open and close, and if opened, to the degree desired. The fuel flow control valve 50 may be another type of valve, including those controlled by stepper motors, so long as the valve can be partially closed to enforce a low flow condition. If the control system 52 desires to allow fuel flow at full flow rate, the control system 52 will send a signal, which is typically a pulse width modulated (PWM) signal in the case of a solenoid controlled proportional valve, over the flow control valve signal line 65 to fully open the valve 50. If flow is not allowed, the valve 50 will be closed. If flow is allowed at less than full flow rate, the valve 50 will be partially closed. As will be discussed below in the fuel quality logic, the control system 52 controls the fuel flow control valve 50 to execute the fuel control logic to control fuel dispensed. The control of the fuel flow control valve 50 completes the closed loop nature of the system, wherein sensing devices 28, 36, 42, 44 are inputs to the control system to provide an indication of fuel quality and filter 34 status, and the output is from the control system 52 to the fuel flow control valve 50 to control fuel in response. The control system 52 can also generate reports and alarms, and send messages both locally and off-site to report the status of the sensing devices 28, 36, 42, 44, fuel quality as a result of analysis of the sensing devices 28, 36, 42, 44 according to executed fuel quality logic.

In this regard, the control system 52 may contain an internal clock 64 to use for determining times or the resolution of accepting or receiving readings from the sensing devices 28, 36, 42, 44, or to perform other time based functions. The control system 52 also contains user interface electronics 66 that are used to allow the control system 52 to interface to external input and output devices that are either customer accessible and used to access the control system 52 or to provide recording and storage of information. For example, a terminal or computer 68 may be interfaced to the control system 52. This will allow a user to access information about the fuel quality from the control system 52 and program parameters for the fuel quality logic. A database 70 may be provided and interfaced to the control system 52 via the user interface 66 to store fuel quality information and/or information about the sensing devices 28, 36, 42, 44. A printer 72 may be coupled to the control system 52 to print out reports and/or alarms about fuel quality and/or sensing device 28, 36, 42, 44 readings. Further, the control system 52 may be adapted to send any of this information to a remote system 76 located remotely from the fuel dispenser 14 via data transfer interface 74. These communications may be Internet or telephone based, either based on public or private networks. Further, the control system 52 may contain an antenna 78 that allows wireless communication of the aforementioned information to a wireless transceiver 82 via a modulated RF signal 80, wherein the wireless transceiver 82 contains its own antenna to receive the signal 80.

Figure 4A:
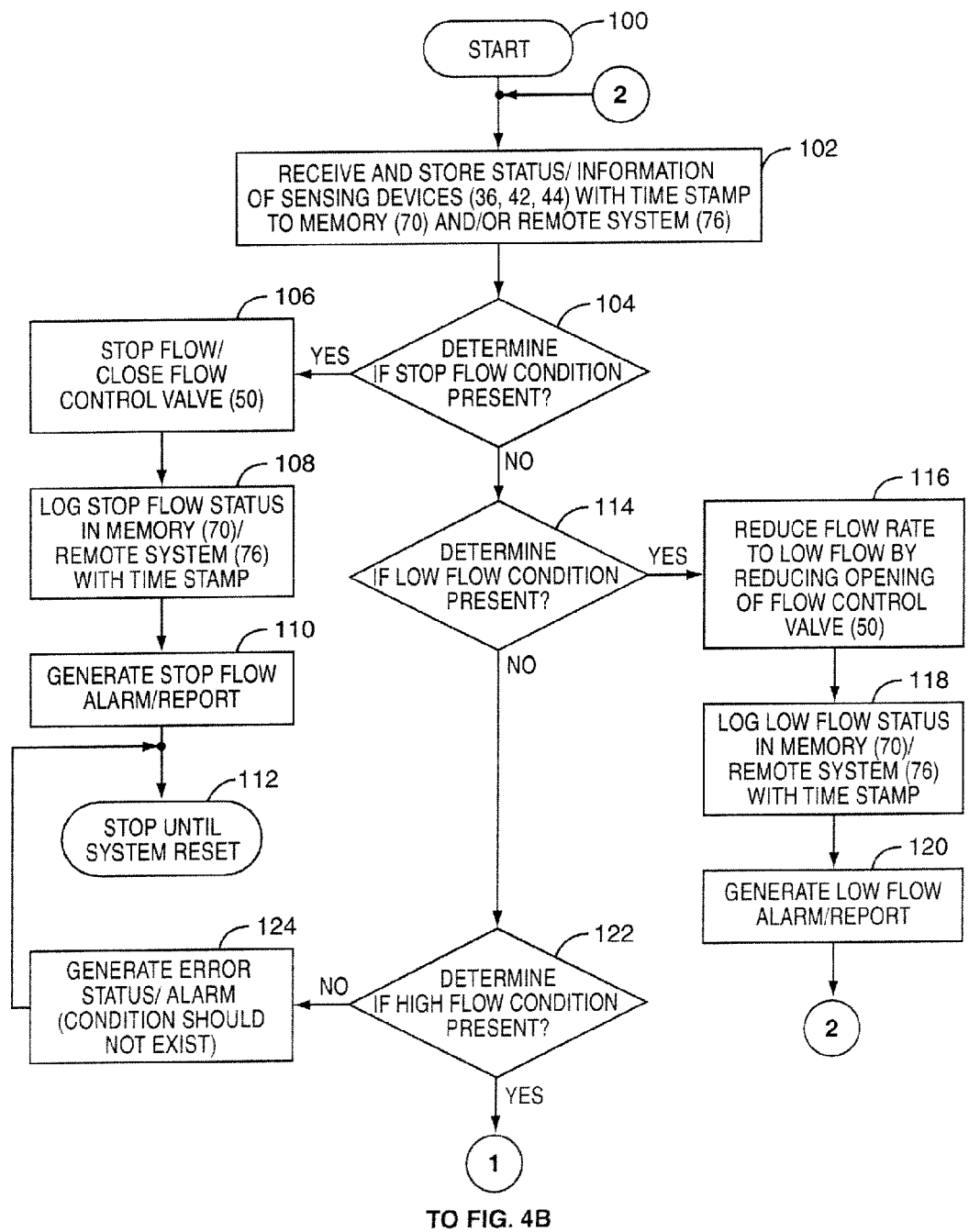
FIGS. 4A and 4B are flowchart diagrams illustrating the basic operation of the fuel quality logic state machine illustrated in FIG. 3 to control the fuel flow dispensed based on the monitored quality of fuel or supporting fueling components in the fuel delivery flow path.
Figure 4B:
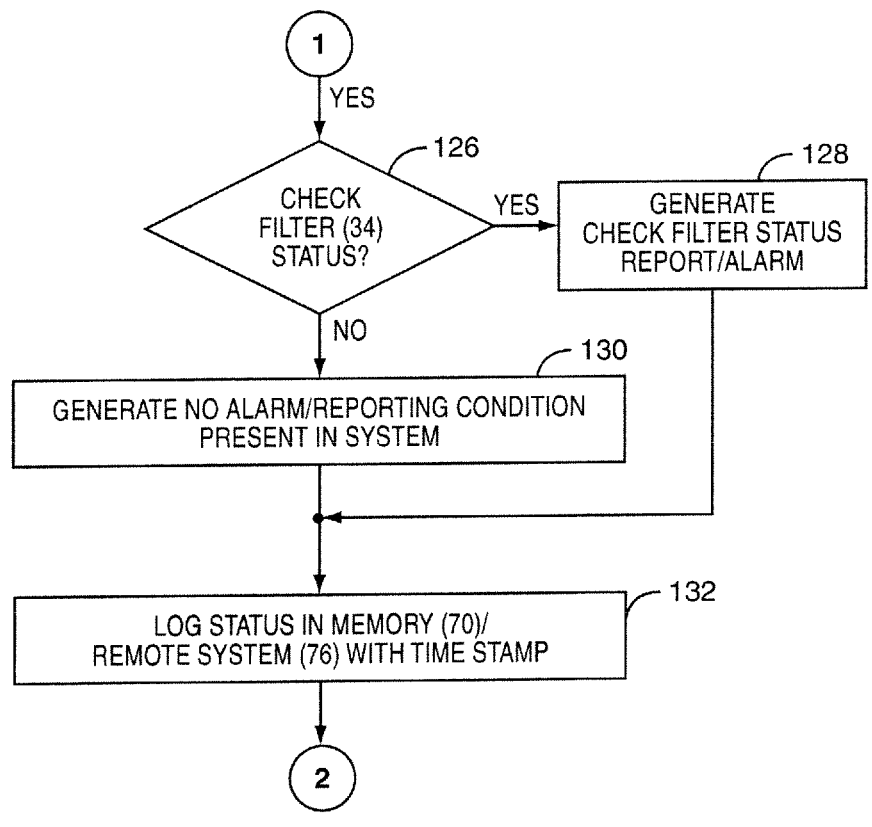

Now that the components and architecture of one embodiment of the fuel dispenser 14 have been set forth and discussed, the fuel quality logic that is performed by the control system 52 using measurements and input from the sensing devices 28, 36, 42, 44 to control fuel delivery and/or report alarms and/or other issues will now be discussed. FIG. 3 contains an overview of the fuel quality logic that is performed in this regard. In the disclosed embodiment, the control system 52 executes software using a microprocessor-based system to perform the fuel quality logic. The flowchart in FIGS. 4A and 4B illustrates an example of the operation of the control system 52 when performing the fuel quality logic, but the fuel quality logic itself will first be discussed with regard to FIG. 3.

As illustrated in FIG. 3, there are three controlled flow rate settings. These are stop flow, low flow, and high flow conditions. Each of these conditions and the characteristics of the sensing devices 28, 36, 42, 44 that cause the control system 52 to enforce these conditions is now discussed.

The control system 52 enforces the stop flow condition to close the fuel flow control valve 50 to completely prevent fuel dispensing when the fuel quality is below acceptable characteristics or the filter 34 has broken down and failed. Several factors can cause the fuel quality to be beyond an acceptable level for any fuel dispensing to occur. For example, if the particle count in the fuel 21, as measured by the particle monitor 44, is in a HIGH condition, meaning the particle count is greater than 15 PPM in one example as illustrated in FIG. 3, fueling is not permitted. This is because the particle contaminant is too great to risk the fuel being dispensed and used by the engine on the delivery side. Obviously, since the particle monitor 44 is located on the outlet side of the filter 34, this allows the control system 52 to know that the filter 34 is either not blocking the contaminant or at a sufficient level to lower the particle count to a level to allow dispensing, or the filter 34 has broken down and is allowing particles to mix in with the fuel 21 in the fuel conduit 18.

If the water content in the fuel 21, as measured by the water sensor 42, is in a HIGH condition, meaning the water content is greater than 15 PPM in one example as illustrated in FIG. 3, fueling is also not permitted. This is because there is too much water in the fuel 21, and this amount of water could cause engine problems or failure on the delivery side. Again, since the water sensor 42 is located on the outlet side 38" of the filter 34, this allows the control system 52 to know that the filter 34 is either not absorbing water out of the fuel 21 or absorbing water at a sufficient level to lower the water level to a level to allow dispensing.

Lastly, if the differential pressure across the filter 34, as measured by the differential pressure sensor 36, indicates a high pressure drop or high differential pressure and then a low differential pressure sometime shortly thereafter, this is an indication that the filter 34 has broken down due to a high pressure on the inlet side 38' of the filter 34. This means that there is a risk that the filter 34 breakdown will introduce contaminant into the fuel 21 and/or that the filter 34 cannot provide any ability to filter debris and/or absorb water. In short, the filter 34 has failed and has to be replaced. In this instance, the fueling must be stopped by the control system 52.

Further, if the control system 52 detects a stop flow condition, an alarm and/or report is generated. The alarm or report could be a visual indicator to the refueling personnel, a message to the computer 68, memory/database 70, or printer 72, a message to the wireless transceiver 82, or a message to the remote system 76. Service or refueling personnel are then alerted to not only the stop flow condition, but may also determine exactly why the stop flow condition occurred (i.e. due to high particle count, high water content, or filter breakdown). Also note that any of three aforementioned conditions based on the particle count, the water content, and the filter 34 break down individually or together can cause the control system 52 to generate a stop flow condition. This is because each one of these events is serious enough alone to indicate that the fuel quality is not acceptable for dispensing.

If none of the stop flow conditions are present, the control system 52 goes to step 2 as shown in FIG. 3, to determine if a low flow condition should be enforced. The low flow condition is present when the particle count and the water count are at a MEDIUM or LOW level, as shown in FIG. 3, which is sufficient to dispense fuel at an acceptable quality. However, the filter 34 has a high differential pressure across it according to the differential pressure sensor 36. This means that although the filter 34 has not broken down, the filter 34 could easily break down if a high flow fuel source is placed on the inlet side 38' of the filter 34 based on existing blockage present because of contaminant filtered or water absorbed previously. Thus, low flow will alleviate the risk of causing a sufficient pressure to break down the filter 34 until the filter 34 can be replaced. If the filter 34 does actually break down even after a low flow condition is enforced by the control system 52, the fuel quality logic will detect that condition as a stop flow condition according to the logic in step 1.

Next, if neither the stop flow or low conditions are detected by the control system 52, but any of the sensing devices 28, 36, 42, 44 detect a MEDIUM condition, as illustrated by example in FIG. 3, the fuel quality is still of a sufficient level to allow fuel flow at high flow rate as illustrated in step 3 in FIG. 3. However, the filter 34 should be checked since either enough particles or water is not being removed from the fuel 21, or the differential pressure across the filter 34 indicates that the filter 34 retained enough debris and/or water to have an increased pressure drop across the filter 34 versus a clean, new filter. An alarm and/or report will be generated by the control system 52 in response.

Lastly, if the control system 52 does not detect either a stop flow, low flow, or high flow with check filter condition, then this means that all sensing devices 36, 42, 44 are registering a LOW condition as illustrated in step 4 in FIG. 3. This means that high flow is acceptable and the fuel quality is at an appropriate level to allow fuel dispensing. Further, since the differential pressure across the filter 34 is LOW, the filter 34 does not need to be checked or replaced. Again, as discussed above, the limits for each sensing device 28, 36, 42, 44 as to what is a HIGH, MEDIUM, and LOW condition can be programmed at the factory in the control system 52 or programmed by a user via the user interface 66 to the control system 52.

The flowcharts in FIGS. 4A and 4B reiterate the control system's 52 performance of the fuel quality logic in accordance with one embodiment of the invention and to perform the exemplary fuel quality logic illustrated and discussed above in FIG. 3. The process starts (step 100), and the control system receives and/or stores the status or information about the sensing devices 36, 42, 44 with a timestamp using the clock 64 in memory 70 and/or at the remote system 76 (step 102). The control system 52 then determines if there is a stop flow condition present based on the information from the sensing devices 36, 42, 44 (decision 104). If so, the control system 52 causes the fuel flow control valve 50 to close to stop fuel dispensing (step 106). The stop flow status is logged in memory 70 and/or reported to the remote system 76 with a timestamp (step 108). The control system 52 next generates a stop flow alarm and/or report (step 110). The control system 52 then keeps the system in a stop flow mode until the system is reset, typically after an investigation is performed on the fuel 21 quality and/or the filter 34 is replaced (step 112).

If the control system 52 determines in decision 104 that a stop flow condition is not present, the control system 52 next determines if a low flow condition is present (decision 114). If so, the control system 52 will cause the fuel flow control valve 50 to close partially to reduce the flow rate to a low flow (step 116). Next, the control system 52 will log the low flow status in memory 70 and/or with the remote system 76 with a time stamp (step 118). Then, the control system 52 will generate a low flow alarm and/or report to indicate the low flow status (step 120), and return to the beginning of the process (step 102) to look for either a stop flow condition, a high flow condition to then allow high flow, or that a low flow condition is still in force.

If in decision 114, a low flow condition was not detected by the control system 52, the control system will determine if a high flow condition is present (decision 122). If not, an error is generated and an appropriate status/alarm is generated by the control system 52 since this condition should not exist (step 124). The control system 52 should always detect either a stop, low, or high flow condition. If a high flow condition is detected in decision 122, the process continues on to FIG. 4B where the status of the filter 34 is checked by the control system 52 via receipt of the differential pressure from the differential pressure sensor 36 (decision 126). If the check filter status is present, meaning the differential pressure indicates that the filter 34 has some differential pressure even though high flow is allowed, the control system 52 generates a check filter 34 status and/or report or alarm (step 128). If not, then no alarm is generated regarding the filter 34 status (step 130). In either case, the status is then logged in memory 70 and/or at the remote system 76 with a time stamp, and the process continues by repeating the fuel quality logic at step 102.

In step 102 in FIG. 4A, the control system 52 may use the instantaneous real-time receipt of readings from the sensing devices 36, 42, 44 to make decisions in the fuel quality logic. However, it is more practical to take several serial readings in a row and average the readings to ensure that false alarms are not generated and to ensure that enough readings are taken to prevent any bouncing of values or spikes due to events that are not related to fuel quality. A spike or bounce may cause a limit alarm to be exceeded and generate a false alarm. A heightened differential pressure across the filter 34, or water or debris/particle presence in the fuel 21 should be present over multiple readings unless the reading is a false positive reading. In this regard, when step 102 in FIG. 4A is performed, the flowchart process in FIG. 5 may be performed to obtain an average reading of the sensing devices 36, 42, 44 to determine fuel quality logic.

Figure 5:
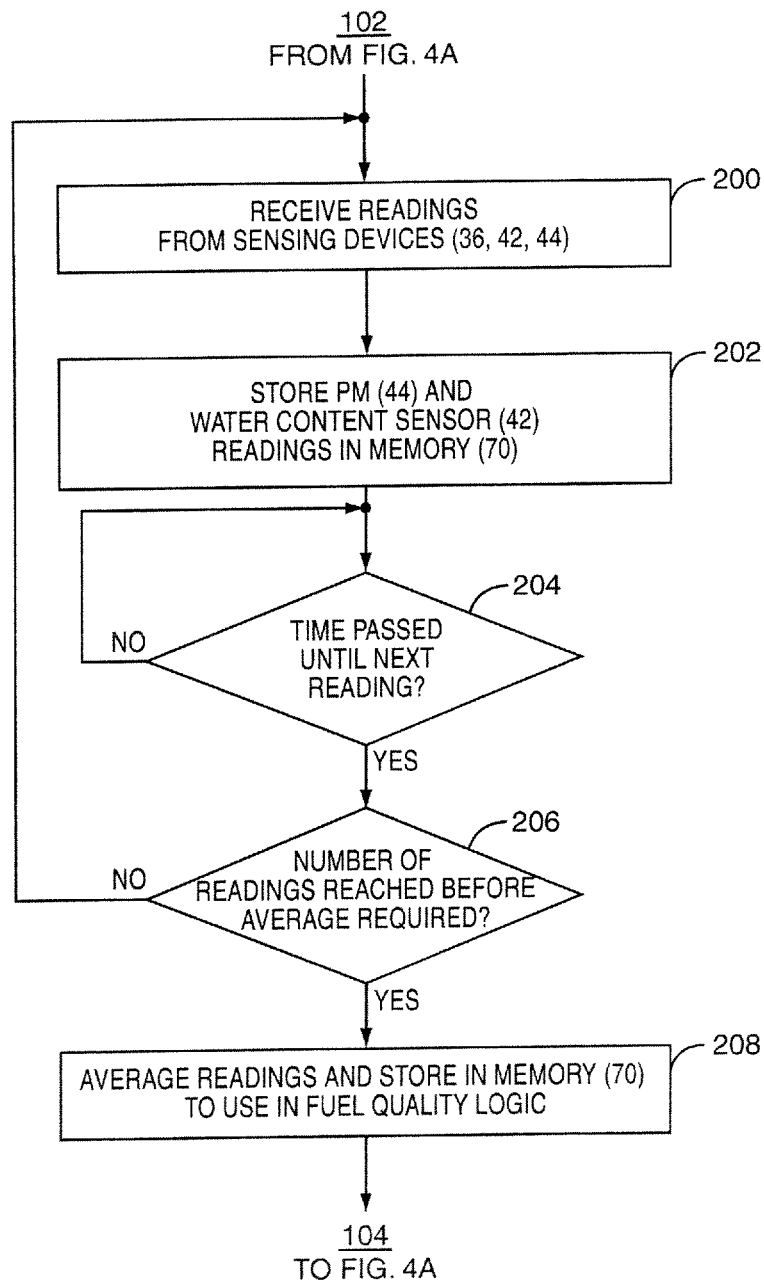
FIG. 5 is a flowchart diagram illustrating one embodiment of the sensing device analysis resolution that may be performed within the fuel quality logic state machine illustrated in FIGS. 4A and 4B to determine the quality of fuel or supporting fueling components in the fuel delivery flow path.

Turning to FIG. 5, the control system 52 receives readings from the sensing devices 36, 42, 44 (step 200). The particle monitor 44 and water sensor 42 readings are stored in memory 70 (step 202). The control system 52 starts a timer using clock 64 and determines if it is time to obtain the next reading (decision 204). If not, the control system 52 waits by returning to decision 204 with the clock running. If the desired time has passed for the control system 52 to take the next reading, the control system 52 determines if the number of readings desired for the desired resolution is reached (decision 206). If not, more readings are obtained from the sensing devices 34, 42, 44 before averaging the readings by returning back to step 200. If so, the control system 52 averages the readings and stores the readings in memory to use in the fuel quality logic. In this manner, average readings rather than instantaneous readings are taken to better implement the fuel quality logic and avoid false readings. A false reading will be averaged into other readings and be minimized as a result. Other logic could be performed, including filtering and elimination of outlier data, as another method of eliminating false data and/or extraneous incorrect readings due to unknown reasons.

Figure 6:
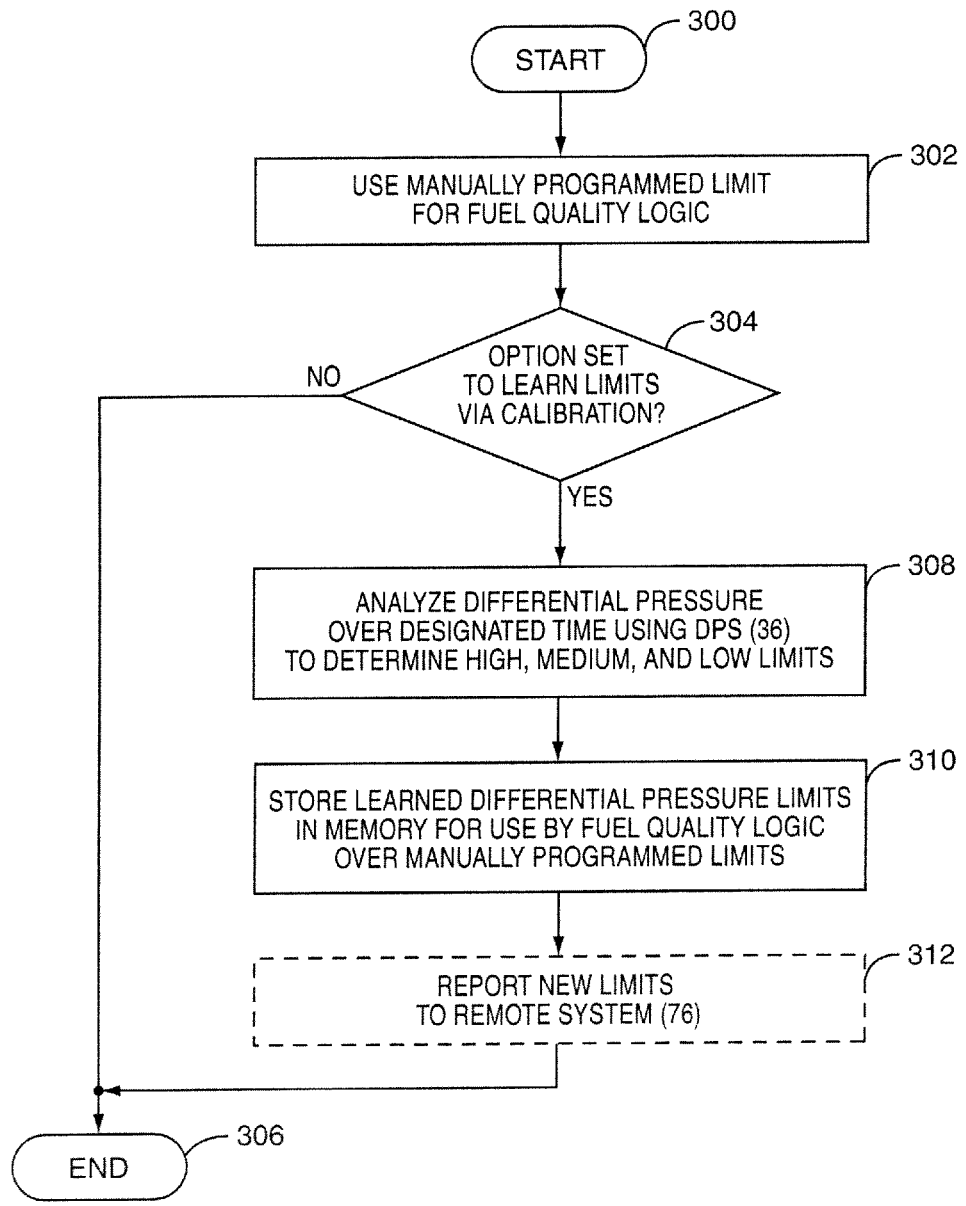
FIG. 6 is a flowchart diagram illustrating one possible embodiment of calibrating manually programmed limits used in the fuel quality logic to determine the quality of fuel or supporting fueling components in the fuel delivery flow path.

Because differential pressure limits vary greatly on the actual fuel dispenser 14, and in particular the size of the fuel conduit 18 as well as the size and brand of the filter 34, using an absolute or programmed, static differential pressure limits for determining HIGH, MEDIUM, and LOW conditions by the control system 52 of the filter 34 status may not be optimal or may cause false readings. Thus, a process like that contained in the flowchart of FIG. 6 may be implemented as an example of allowing the control system 52 to adjust or learn the desired limits for the differential pressure. The process starts by the control system 52 using manually programmed limits for differential pressure in the fuel quality logic process (step 302). The control system 52 determines if an option is set in memory 70 to allow the control system 52 to learn or adjust the limits via a calibration technique (decision 304). If not, the process ends, and the fuel quality logic will simply use the hard limits for analyzing the status of the filter 34 via the differential pressure across the filter 34.

If however, adjustment or learning is allowed, the control system 52 will analyze multiple differential pressure sensor 36 readings over time to determine limits for the HIGH, MEDIUM, and LOW conditions (step 308). The control system 52 will assume in the beginning that the filter 34 is working properly, and will then use the actual differential pressure across the filter 34 as the LOW, nominal differential pressure. Limits for MEDIUM and HIGH will then be adjusted based on this nominal differential pressure as well as breakdown limits of the filter 34. The learned or adjusted differential pressure limits will be stored in memory 70 by the control system 52 for use in the fuel quality logic and in place of the programmed limits for differential pressure (step 310). As an optional step, the new limits may be sent to the remote system 76 so that remote operators will know the exact limits for the HIGH, MEDIUM, and LOW conditions (step 312), and the process ends 306. Preferably, the automatic calibration or learned differential pressure routine illustrated in FIG. 6 will only be performed during initial operation when the filter 34 has just been replaced and is known to be in good working condition. After an initial period of time, the differential pressure across the filter 34 cannot be used to adjust the fuel quality logic limits, because it will not be known if the filter 34 is in a nominal, good working condition because of possible debris and/or water retention.

It may also be important to monitor the average particle count using particle monitor 44 and/or the amount of water using water sensor 42 over the entire fueling. This is because in addition to performing the fuel quality logic described above, if the PPM count of either particles or water in the fuel 21 is over a threshold value, say 15 PPM for example, over the entire fueling, the entire fueling load must be rejected and the aircraft or vehicle refueled. Even if there is a spike in the particle count or water presence for a short burst or period of time, if the average count is within a prescribed tolerable amount, the fueling can continue and be counted as sufficient to avoid refueling. A display (not shown) coupled to the control system 52, and/or display 20, a display coupled to the user interface 66 such as computer 68, or a display coupled to the wireless transceiver 82 for example, may display the running average particle count and water content in real-time and/or at the end of a refueling to indicate to an operator whether the refueling was successful. Or the control system 52 can monitor the average count and generate an alarm and/or report like that described previously for other conditions.

Note that any of the sensing devices 28, 36, 42, 44 are optional. Any of the fuel quality logic may be implemented partially or fully in the example fuel quality logic in FIG. 3. Moisture or water sensor 28 is used by the control system 52 to be able to determine the water absorption performance of the fuel filter 34. The present invention can be implemented in any fuel dispenser. Any type of control system may be used with the present invention. The control system may be located on the fuel dispenser 14 or may be located in a separate location either proximate the fuel dispenser 14 or remotely. The control system may be accessed by a user either on-site or remotely.

The present invention may also be employed on a hydrant cart refueling truck that obtains its fuel to delivery from a separate storage tank. The present invention, and particularly the control system and the components necessary to determine the fuel quality and related statuses described above, may also be provided on a new refueling truck during manufacture or may be retrofitted to existing refueling trucks. Further, the control system and/or monitoring devices of the present invention may be powered by a power system on the refueling truck, an external source, or by battery power as examples.

Those skilled in the art will recognize improvements and modifications to the preferred embodiments of the present invention. All such improvements and modifications are considered within the scope of the concepts disclosed herein.

What is claimed is:

1. A fuel dispensing apparatus for delivering fuel from a fuel source, comprising:
   a flow conduit defining a fluid flow path from a fuel source to an outlet where fuel is dispensed;
   a fuel filter located along said fluid flow path;
   an electrically-controlled valve located along said fluid flow path;
   at least one water detector configured to detect at least one water fuel quality characteristic in real time as said fuel passes through said flow conduit;
   at least one particulate monitor configured to detect at least one particulate fuel quality characteristic in real time as said fuel passes through said flow conduit;
   at least one differential pressure sensor configured to detect at least one fuel pressure drop across said fuel filter in real time, and
   an electronic control system in communication with each of said at least one water detector, particulate monitor, and differential pressure sensor and configured to receive fuel quality sensor information corresponding to said at least one detected water fuel quality characteristic, particulate fuel quality characteristic, and fuel pressure drop across said fuel filter in real time,
   wherein said electronic control system is further configured to automatically direct said valve from a high flow position corresponding to a first flow rate of said fuel to a low flow position corresponding to a second flow rate of said fuel lower than said first flow rate, thereby maintaining said flow of said fuel through said flow conduit to be delivered to said fuel source at a reduced flow rate, in response to receiving fuel quality sensor information indicating that:
      said at least one fuel pressure drop across said fuel filter exceeds a first pressure threshold;
      said at least one water fuel quality characteristic does not exceed a first water fuel quality threshold; and said at least one particulate fuel quality characteristic does not exceed a first particulate fuel quality threshold.

2. A fuel dispensing apparatus as set forth in claim 1, wherein said electronic control system is further configured to direct said valve to a stop flow position if said at least one fuel pressure drop across said fuel filter exceeds a second pressure threshold greater than said first pressure threshold.

3. A fuel dispensing apparatus as set forth in claim 2, wherein said electronic control system is further configured to provide an alarm if said at least one fuel pressure drop exceeds said second pressure threshold, said at least one water fuel quality characteristic does not exceed said first water fuel quality threshold, and said at least one particulate fuel quality characteristic does not exceed said first particulate fuel quality threshold.

4. A fuel dispensing apparatus as set forth in claim 1, wherein said electronic control system is further configured to provide a check filter indication if said at least one fuel pressure drop exceeds said first pressure threshold.

5. A fuel dispensing apparatus as set forth in claim 1, wherein at least one of said at least one water detector and said at least one particulate monitor is located downstream of said fuel filter.

6. A fuel dispensing apparatus as set forth in claim 1, wherein said electronic control system is further configured to automatically direct said valve to vary said flow of said fuel through said flow conduit based on a plurality of water fuel quality characteristics detected at different times by a common fuel quality sensor device water detector.

7. A fuel dispensing apparatus as set forth in claim 6, wherein said electronic control system is further configured to average said plurality of water fuel quality characteristics to determine an average water fuel quality characteristic and automatically directs said valve to vary said flow of said fuel through said flow conduit based on said average water fuel quality characteristic.

8. A fuel dispensing apparatus as set forth in claim 1, wherein said electronic control system is further configured to change at least one threshold for at least one of said at least one water fuel quality characteristic, said at least one particulate fuel quality characteristic, and said at least one fuel pressure drop across said fuel filter based on said fuel quality sensor information, at least one of said at least one detected water fuel quality characteristic, said at least one particulate fuel quality characteristic, and said at least one fuel pressure drop across said fuel filter.

9. A fuel dispensing apparatus as set forth in claim 1, further comprising a fluid meter located along said fluid flow path to measure a quantity of fuel being dispensed.

10. A fuel dispensing apparatus as set forth in claim 1, wherein said fuel source comprises an on-board fuel tank.

11. A fuel dispensing apparatus as set forth in claim 1, wherein said electronic control system is further configured to report to a remote computer.

12. A refueling vehicle for delivering fuel to a fuel tank comprising:
an on-board fuel tank; and
an on-board fuel dispensing apparatus including:
(i) a flow conduit defining a fluid flow path from said fuel tank to an outlet where fuel is dispensed;
(ii) a pump for moving fuel through said flow conduit;
(iii) an electrically-controlled valve located along said fluid flow path;
(iv) a fluid meter located along said fluid flow path to measure a quantity of fuel being dispensed;
(v) at least one water detector configured to detect at least one water fuel quality characteristic in real time as said fuel passes through said flow conduit;
(vi) at least one particulate monitor, configured to detect at least one particulate fuel quality characteristic, said at least one particulate monitor adapted to detect at least one corresponding fuel quality characteristic in real time as said fuel passes through said flow conduit;
(vii) at least one differential pressure sensor configured to detect at least one fuel pressure drop across a fuel filter in real time; and
(vi) an electronic control system in communication with each of said at least one water detector, particulate monitor, and differential pressure sensor and configured to to receive fuel quality sensor information corresponding to said at least one detected water fuel quality characteristic, particulate fuel quality characteristic, and fuel pressure drop across said fuel filter in real time,
wherein said electronic control system is further configured to automatically direct said valve from a high flow position corresponding to a first flow rate of said fuel to a low flow position corresponding to a second flow rate of said fuel lower than said first flow rate, thereby maintaining said flow of said fuel through said flow conduit to be delivered to said fuel source at a reduced flow rate, in response to receiving fuel quality sensor information indicating that:
said at least one fuel pressure drop across said fuel filter exceeds a first pressure threshold;
said at least one water fuel quality characteristic does not exceed a first water fuel quality threshold; and
said at least one particulate fuel quality characteristic does not exceed a first particulate fuel quality threshold.

13. A refueling vehicle as set forth in claim 12, wherein said electronic control system is further configured to direct said valve to one of said high flow position corresponding to said first flow rate of said fuel, said low flow position corresponding to said second flow rate of said fuel lower than said first flow rate, or a stop flow position corresponding to a flow rate of zero, based on said fuel quality sensor information.

14. A refueling vehicle as set forth in claim 12, wherein said electronic control system is further configured to automatically direct said valve to vary said flow of said fuel through said flow conduit based on a plurality of water fuel quality characteristics detected at different times by a common water detector.

15. A refueling vehicle as set forth in claim 12, wherein said electronic control system is further configured to direct said valve to a stop flow position if said at least one fuel pressure drop measured by said at least one differential pressure sensor across said fuel filter exceeds a second pressure threshold.

16. A refueling vehicle as set forth in claim 15, wherein said electronic control system is further configured to provide an alarm if said at least one fuel pressure drop measured by said at least one differential pressure sensor exceeds said second pressure threshold.

17. A refueling vehicle as set forth in claim 12, wherein said electronic control system is further configured to provide a check filter indication if said at least one fuel pressure drop measured by said at least one differential pressure sensor exceeds said first pressure threshold.

18. A refueling vehicle as set forth in claim 14, wherein said electronic control system is further configured to average said plurality of water fuel quality characteristics to determine an average water fuel quality characteristic and automatically direct said valve to vary said flow of said fuel through said flow conduit based on said average water fuel quality characteristic.

19. A refueling vehicle as set forth in claim 12, wherein said electronic control system is further configured to change at least one threshold for at least one of said at least one water fuel quality characteristic, said at least one particulate fuel quality characteristic, and said at least one fuel pressure drop across said fuel filter based on at least one of said at least one detected water fuel quality characteristic, said at least one particulate fuel quality characteristic, and said at least one fuel pressure drop across said fuel filter.

20. A method of controlling dispensing of fuel from a fuel source based on contemporaneous quality monitoring, said method comprising:
 (a) providing a flow conduit between a fuel source and a dispensing outlet, said flow conduit having a replaceable fuel filter and an electrically-controlled flow valve located therealong;
 (b) detecting at least one water fuel quality characteristic, at least one particulate fuel quality characteristic, and at least one pressure drop across said fuel filter in real time as fuel passes through said flow conduit and producing fuel quality sensor information indicative thereof in real time;
 (c) providing said fuel quality sensor information in real time to an electronic control system adapted to evaluate said fuel quality sensor information; and
 (d) utilizing said electronic control system in real time to automatically direct operation of said flow valve to deliver said fuel to said fuel source at a variable flow rate based on an evaluation of said fuel quality sensor information such that the flow rate is reduced from a first flow rate of said fuel to a second flow rate of said fuel lower than said first flow rate, thereby maintaining said flow of said fuel through said flow conduit to be delivered to said fuel source at a reduced flow rate, in response to receiving fuel quality sensor information indicating that:
  said at least one fuel pressure drop across said fuel filter exceeds a first pressure threshold;
  said at least one water fuel quality characteristic does not exceed a first water fuel quality threshold; and
  said at least one particulate fuel quality characteristic does not exceed a first particulate fuel quality threshold.

21. A method as set forth in claim 20, wherein said at least one fuel quality characteristic comprises a plurality of fuel quality characteristics comprised of at least one particulate count and at least one water content.

22. A method as set forth in claim 20, wherein said electronic control system operates in (d) to direct said flow valve to a stop flow position if said at least one fuel pressure drop across said fuel filter exceeds a second pressure threshold.

23. A method as set forth in claim 22, wherein said second pressure threshold is approximately 14.5 psi.

24. A method as set forth in claim 22, further comprising:
 (e) utilizing said electronic control system to provide an alarm if said at least one fuel pressure drop exceeds said second pressure threshold.

25. A method as set forth in claim 22, wherein said first pressure threshold is approximately 7 psi.

26. A method as set forth in claim 22, further comprising:
 (e) utilizing said electronic control system to provide a check filter indication if said at least one fuel pressure drop exceeds said first pressure threshold.

27. A method as set forth in claim 20, wherein said at least one water fuel quality characteristic includes water content.

28. A method as set forth in claim 27, wherein said electronic control system operates in (d) to direct said flow valve to a stop flow position if said water content exceeds a second water fuel quality threshold.

29. A method as set forth in claim 28, wherein said second water fuel quality threshold is approximately 15 PPM.

30. A method as set forth in claim 28, wherein said water content is detected in (b) at a location downstream of said fuel filter.

31. A method as set forth in claim 20, wherein detecting said at least one water fuel quality characteristic and said at least one particulate fuel quality characteristic comprises detecting both particle count and water content.

32. A method as set forth in claim 31, wherein said electronic control system operates in (d) to direct said flow valve to a stop flow position if said particle count exceeds a second particulate fuel quality threshold.

33. A method as set forth in claim 32, wherein said second particulate fuel quality threshold is approximately 15 PPM.

34. A method as set forth in claim 32, wherein said particle count is detected in (b) at a location downstream of said fuel filter.

35. A method as set forth in claim 20, wherein said electronic control system automatically directs said flow valve to vary flow of said fuel through said flow conduit based on a plurality of water fuel quality characteristics detected at different times by a common water detector.

36. A method as set forth in claim 35, wherein said electronic control system averages said plurality of water fuel quality characteristics to determine an average water fuel quality characteristic and automatically directs said flow valve to vary said flow of said fuel through said flow conduit based on said average water fuel quality characteristic.

37. A method as set forth in claim 20, wherein said electronic control system is configured to change at least one threshold for said one of said at least one water fuel quality characteristic and said at least one particulate fuel quality characteristic based on said fuel quality sensor information.

38. A fuel dispensing apparatus as set forth in claim 1, wherein said electronic control system is further configured to direct said valve to a stop flow position if a fuel pressure drop across said fuel filter exceeds a second pressure threshold followed by said fuel pressure drop across said fuel filter being lower than said second Pressure threshold.

39. A fuel dispensing apparatus as set forth in claim 38, wherein said electronic control system is further configured to calibrate said second pressure threshold.

40. A method as set forth in claim 22, further comprising calibrating a differential pressure sensor to learn said second pressure threshold.

41. A method as set forth in claim 20, further comprising calibrating a differential pressure sensor to learn said first pressure threshold.

42. A fuel dispensing apparatus as set forth in claim 5, wherein said at least one of said at least one water detector and said at least one particulate monitor is located upstream of said fuel filter.

43. A fuel dispensing apparatus as set forth in claim 42, wherein said electronic control system is configured to:
 determine a likelihood of failure for said fuel filter based on a comparison of said fuel quality sensor information received from said at least one water detector or particulate monitor located upstream of said fuel filter to said fuel quality sensor information received from said at least one water detector or particulate monitor located downstream of said fuel filter; and vary said flow of said fuel through said flow conduit to be delivered to said fuel source based on said determined likelihood of failure for said fuel filter.

44. A fuel dispensing apparatus as set forth in claim 1, wherein each of said at least one water detector, particulate monitor, and differential pressure sensor is adapted to detect said at least one corresponding fuel quality characteristic instantaneously in real time as said fuel passes through said flow conduit; and said electronic control system is in communication with each of said at least one water detector, particulate monitor, and differential pressure sensor and is configured to receive said fuel quality sensor information corresponding to said at least one corresponding detected fuel quality characteristic instantaneously in real time.

45. The fuel dispensing apparatus as set forth in claim 1, wherein said electronic control system is further configured to automatically direct said valve to vary said flow of said fuel through said flow conduit based on a plurality of particulate fuel quality characteristics detected at different times by a common particulate monitor.

46. The fuel dispensing apparatus as set forth in claim 6, wherein said electronic control system is further configured to average said plurality of particulate fuel quality characteristics to determine an average particulate fuel quality characteristic and automatically direct said valve to vary said flow of said fuel through said flow conduit based on said average particulate fuel quality characteristic.

47. The refueling vehicle as set forth in claim 14, wherein said electronic control system is further configured to automatically direct said valve to vary said flow of said fuel through said flow conduit based on a plurality of particulate fuel quality characteristics detected at different times by a common particulate monitor.

48. The refueling vehicle as set forth in claim 47, wherein said electronic control system is further configured to average said plurality of particulate fuel quality characteristics to determine an average particulate fuel quality characteristic and automatically direct said valve to vary said flow of said fuel through said flow conduit based on said average particulate fuel quality characteristic.

49. The method as set forth in claim 20, wherein said electronic control system is further configured to automatically direct said flow valve to vary flow of said fuel through said flow conduit based on a plurality of particulate fuel quality characteristics detected at different times by a common water detector.

50. The method as set forth in claim 49, wherein said electronic control system is further configured to average said plurality of particulate fuel quality characteristics to determine an average particulate fuel quality characteristic and automatically direct said flow valve to vary said flow of said fuel through said flow conduit based on said average particulate fuel quality characteristic.

* * * * *